United States Patent
Ooi (10) Patent No.: US 9,769,469 B2
(45) Date of Patent: Sep. 19, 2017

(54) FAILURE DETECTION APPARATUS AND FAILURE DETECTION PROGRAM

(71) Applicant: DENSO CORPORATION, Kariya, Aichi-pref. (JP)

(72) Inventor: Takashi Ooi, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/789,536

(22) Filed: Jul. 1, 2015

(65) Prior Publication Data

US 2016/0007018 A1 Jan. 7, 2016

(30) Foreign Application Priority Data

Jul. 2, 2014 (JP) .................................. 2014-137008

(51) Int. Cl.
*H04N 17/00* (2006.01)
*H04N 17/02* (2006.01)
(Continued)

(52) U.S. Cl.
CPC ............. *H04N 17/002* (2013.01); *G06K 9/32* (2013.01); *G06T 7/0002* (2013.01);
(Continued)

(58) Field of Classification Search
USPC ....... 348/187, 180, 118, 119, 159, 148, 143, 348/49, 50, 47, 36, 86; 382/103, 154,
(Continued)

(56) References Cited

U.S. PATENT DOCUMENTS 7,650,047 B2 * 1/2010 Jin .................. G06T 7/0022
382/218
7,782,487 B2 * 8/2010 Nakanishi .............. H04N 1/387
358/1.13
(Continued)

FOREIGN PATENT DOCUMENTS

JP 2000-123151 4/2000
JP 2005-012844 1/2005
(Continued)

*Primary Examiner* — Jefferey F Harold
*Assistant Examiner* — Mustafizur Rahman
(74) *Attorney, Agent, or Firm* — Knobbe, Martens, Olson & Bear, LLP (57) ABSTRACT

In a failure detecting apparatus, acquiring unit acquires a plurality of images captured by a plurality of imaging devices in which exposures thereof are capable of being individually controlled. The plurality of images including an overlapped region that represents a region where images are overlapped. The region extracting unit extracts a plurality of overlapped regions from the plurality of images acquired by the acquiring unit. The feature extracting unit extracts features of image from the plurality of overlapped regions extracted by the region extracting unit. Further, the comparing unit compares the features of image between the plurality of overlapped regions and the similarity determining unit determines whether or not the features of image are similar based on a result of comparing by the comparing unit. The failure determining unit determines a failure in the imaging device when the similarity determining unit determines the features of image are not similar.

18 Claims, 6 Drawing Sheets

(51) Int. Cl.
*G06K 9/32* (2006.01)
*G06T 7/00* (2017.01)
*G06K 9/20* (2006.01)
*G06K 9/00* (2006.01)

(52) U.S. Cl.
CPC . *G06K 9/00791* (2013.01); *G06K 2009/2045* (2013.01); *G06T 2207/10012* (2013.01); *G06T 2207/10021* (2013.01); *G06T 2207/30168* (2013.01); *G06T 2207/30252* (2013.01)

(58) Field of Classification Search
USPC .................. 382/280, 190, 141, 276, 284
See application file for complete search history.

(56) References Cited

U.S. PATENT DOCUMENTS

| | | | | |
|---|---|---|---|---|
| 8,559,724 | B2* | 10/2013 | Choi | G06F 17/30781 382/190 |
| 2002/0018119 | A1 | 2/2002 | Kogure et al. | |
| 2002/0051572 | A1* | 5/2002 | Matsumoto | G06K 9/4604 382/190 |
| 2003/0185340 | A1* | 10/2003 | Frantz | G01N 21/8806 378/57 |
| 2004/0227908 | A1* | 11/2004 | Wada | H04N 5/74 353/94 |
| 2006/0078165 | A1* | 4/2006 | Watanabe | G06T 7/248 382/107 |
| 2008/0304753 | A1* | 12/2008 | Sohma | G06F 17/30256 382/218 |
| 2010/0165102 | A1* | 7/2010 | Klebanov | B60Q 1/115 348/135 |
| 2010/0265314 | A1* | 10/2010 | Nakashio | H04N 1/3876 348/36 |
| 2012/0081519 | A1* | 4/2012 | Goma | H04N 5/247 348/47 |
| 2012/0194665 | A1* | 8/2012 | Kilian | H04N 5/2226 348/86 |
| 2013/0135490 | A1* | 5/2013 | Sagisaka | H04N 5/23212 348/222.1 |
| 2013/0147948 | A1 | 6/2013 | Higuchi et al. | |
| 2013/0278774 | A1* | 10/2013 | Fujimatsu | G08B 13/19645 348/159 |
| 2014/0104582 | A1* | 4/2014 | Mori | H04N 9/3185 353/30 |
| 2014/0347485 | A1* | 11/2014 | Zhang | B60R 11/04 348/148 |
| 2015/0161775 | A1* | 6/2015 | Kim | G06T 5/50 345/634 |
| 2016/0112689 | A1* | 4/2016 | Okamoto | H04N 9/3147 348/745 |

FOREIGN PATENT DOCUMENTS

| | | |
|---|---|---|
| JP | 2005-033680 | 2/2005 |
| JP | 4953498 | 3/2012 |
| JP | 2012-100025 | 5/2012 |

* cited by examiner

FAILURE DETECTION APPARATUS AND FAILURE DETECTION PROGRAM

CROSS-REFERENCE TO RELATED APPLICATION

This application is based on and claims the benefit of priority from earlier Japanese Patent Application No. 2014-137008 filed Jul. 2, 2014, the description of which is incorporated herein by reference.

BACKGROUND

Technical Field

The present disclosure relates to failure detection apparatus that detects a failure of an imaging device and a failure detection program.

Description of the Related Art

Conventionally, an imaging device that performs imaging by using a stereo camera has been known. For example, Japanese Patent Number 4953498 discloses an imaging device detecting that the imaging cannot be properly performed due to some poor environmental conditions such as imaging under backlight.

However, according to the above-described imaging device, there has been a problem that the imaging device cannot recognize whether the imaging cannot be performed due to a poor environmental condition or a fault of the imaging device.

SUMMARY

It is thus desired to provide a failure detection apparatus that detects a failure of an imaging device and a failure detection program.

In the failure detecting apparatus according to the present disclosure, acquiring unit acquires a plurality of images captured by a plurality of imaging devices in which exposures thereof are capable of being individually controlled. The plurality of images each including an overlapped region that represents a region where images are overlapped. The region extracting unit extracts a plurality of overlapped regions from the plurality of images acquired by the acquiring unit. The feature extracting unit extracts features of image from the plurality of overlapped regions extracted by the region extracting unit. Further, the comparing unit compares the features of image between the plurality of overlapped regions and the similarity determining unit determines whether or not the features of image are similar based on a result of comparing by the comparing unit. The failure determining unit determines a failure in the imaging device when the similarity determining unit determines the features of image are not similar.

Specifically, in the failure detecting apparatus according to the present disclosure, the failure determination is performed on the basis of whether or not features of image are similar, by using characteristics in which similar features of image are likely to present in the overlapped region with high probability even when the captured images are acquired from different imaging devices. Thus, according to the failure detecting apparatus of the present disclosure, failures in the imaging devices can preferably be detected.

The description of respective claims can be combined arbitrarily as much as possible. In this respect, a part of configurations may be excluded as long as essential of the present disclosure is attained.

BRIEF DESCRIPTION OF THE DRAWINGS

In the accompanying drawings:

FIG. 4 is an explanatory diagram showing a luminance histogram when characteristics of image corresponding to a right camera and characteristics of image of a left camera are similar;

FIG. 5 is an explanatory diagram showing luminance histogram when characteristics of image corresponding to a right camera and characteristics of image of a left camera are not similar.

DETAILED DESCRIPTION OF THE PREFERRED EMBODIMENTS

With reference to the drawings, hereinafter is described an embodiment of the present disclosure.

Configuration of the Embodiment

A failure detection apparatus 1 according to the present disclosure is mounted on a vehicle (own vehicle) such as a passenger vehicle. The failure detection apparatus 1 includes a function that detects whether or not any one of plurality of cameras has a fault.

Figure 1:
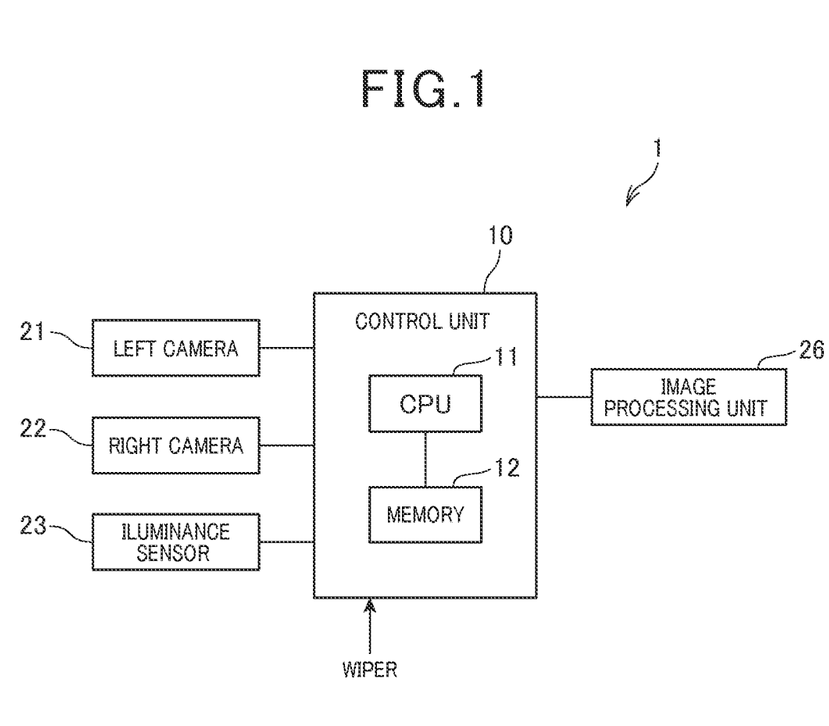
FIG. 1 is a block diagram showing an overall configuration of a failure detection apparatus according to an embodiment of the present disclosure.

As shown in FIG. 1, the failure detection apparatus 1 includes a control unit 10, a left camera 21, a right camera 22, an illuminance sensor 23 and an image processing unit 26. The left camera 21 and the right camera 22 are configured as a well-known stereo camera having an imaging area based on the running direction of the own vehicle and disposed apart from each other with a predetermined distance.

Also, the left camera 21 and the right camera 22 are disposed such that an image outside a vehicle-cabin in the running direction of the own vehicle can be captured from inside the vehicle-cabin. The left camera 21 and the right camera 22 are configured to set a setting value of the camera (image parameter) such as a control amount of exposure or a gain according to a command transmitted from the control unit 10.

The left camera 21 and the right camera 22 repeatedly capture images at predetermined periods and transmit captured images to the control unit 10. Further, the left camera 21 and the right camera 22 output to the control unit 10, instead of captured images, a test pattern which is stored in the cameras in advance, when receiving a command from the control unit 10 commanding an output of a test pattern.

The illuminance sensor 23 is configured as a well-known illuminance sensor that detects brightness surrounding the own vehicle. The illuminance sensor 23 transmits a detection result of the illuminance to the control unit 10. The image processing unit 26 acquires, from the control unit 10, information about an image captured by the left camera 21 and the right camera 22 and a failure of the camera, and performs an image processing for an image captured by a camera which does not have a fault. The image processing unit 26 extracts pedestrians, other vehicles, signs or the like from the captured image and measures distance between the object and the own vehicle.

The control unit 10 is configured as a computer provided with a CPU 11 and a memory 12 such as ROM and RAM. The CPU 11 performs various processing based on a program (including a failure decision program) stored in the memory 12 (computer readable storage medium). It should be noted that the control unit 10 receives a signal showing an operational state of a wiper.

Processes According to Embodiment

Figure 2:
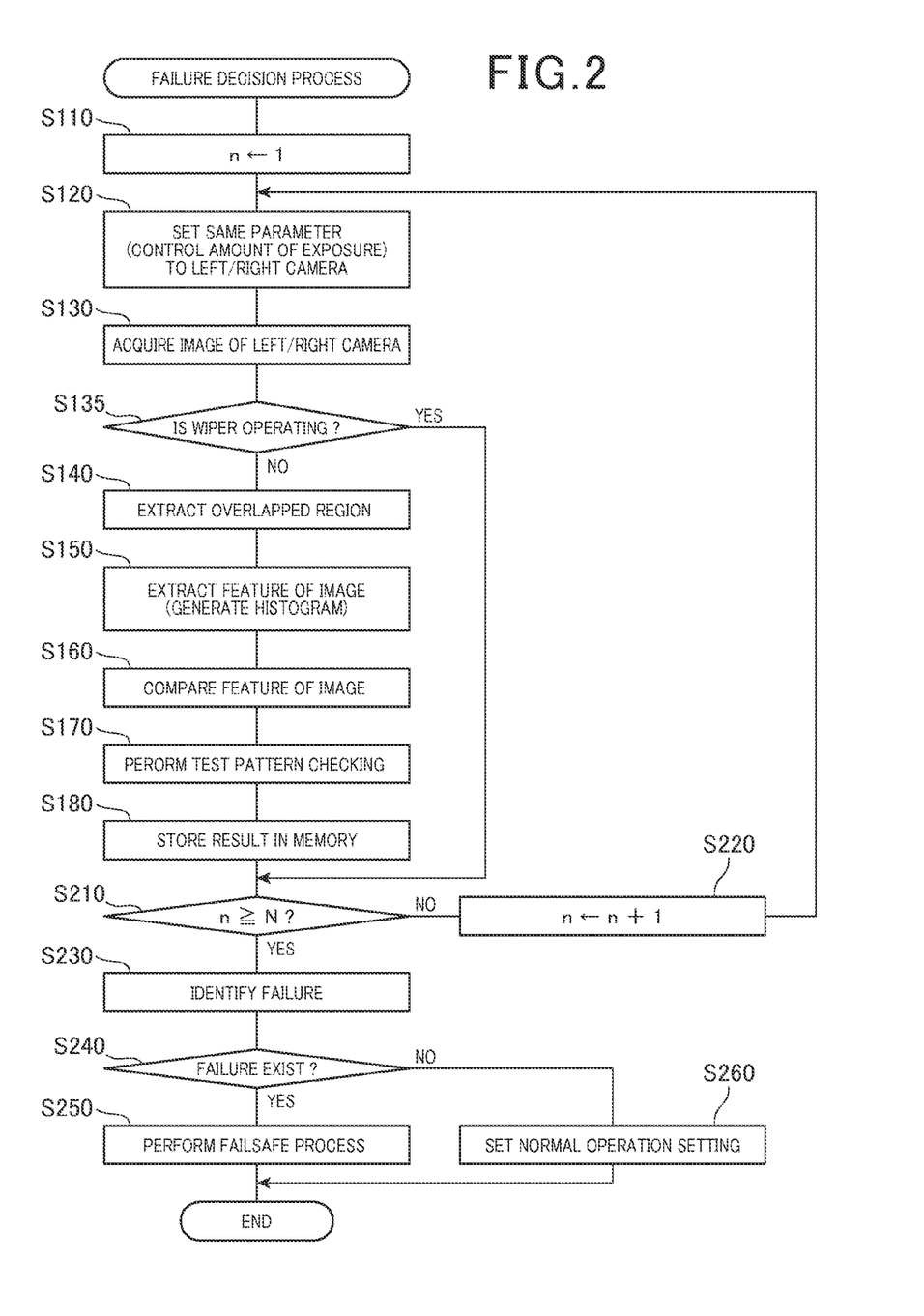
FIG. 2 is a flowchart showing a failure decision procedure executed by a CPU in the control unit according to the embodiment.

In the failure detecting apparatus 1 configured as described above, the control unit 10 performs a failure decision procedure as shown FIG. 2. The failure decision procedure determines whether or not the left camera 21 or the right camera 22 has a failure. The failure detection procedure is activated when power of the own vehicle is supplied and repeatedly performed at every constant periods.

In this procedure, a variable n representing the number of decisions is set to 1 (S110). The variable n is used for determining whether or not the number of decisions reaches a number N necessary for identifying a failure of camera, which is set in advance.

Subsequently, the process transmits a command for setting the same image parameter to the left camera 21 and the right camera 22 (S120). For the image parameter, for example, a value corresponding to a result detected by the illuminance sensor 23 is set.

Subsequently, the process determines whether or not the wiper has been operating (S135). This process may be accomplished by determining whether or not a signal representing an active state of the wiper has been received. Even if the wiper is active, when the position of the wiper is outside the imaging region of the left camera 21 and the right camera 22, the process may determine the wiper is not operating.

When the wiper is operating (S135: YES), the process proceeds to step S210 which is described later. When the wiper is not operating, the process acquires an overlapped-region (S140).

Figure 3:
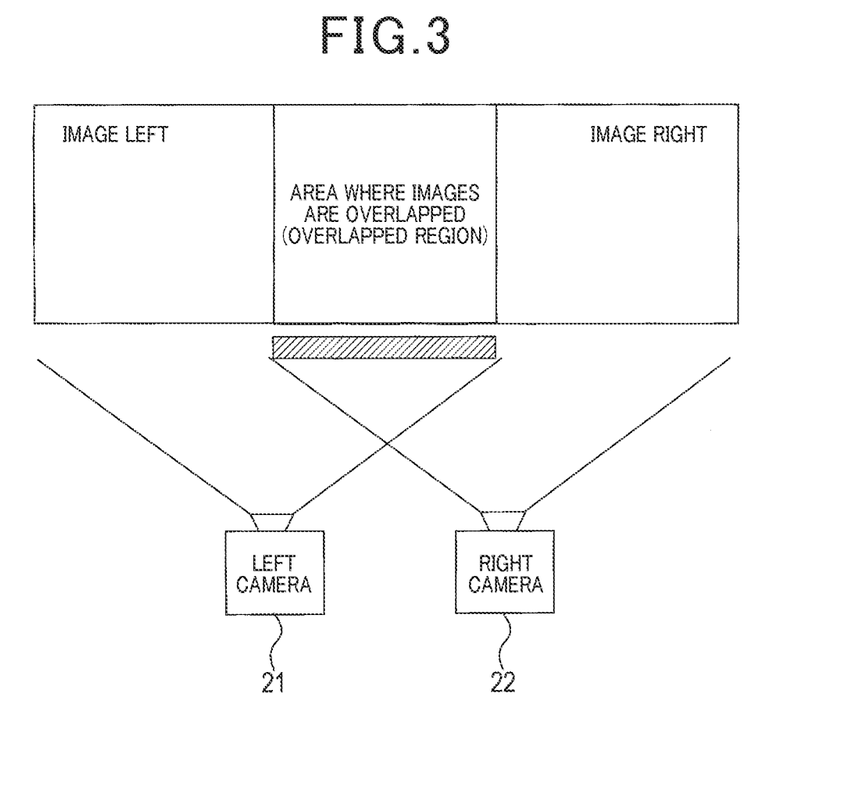
FIG. 3 is an explanatory diagram showing an overlapped region.

The overlapped region represents, for example, an area where the imaging regions are overlapped among respective captured images of the left camera 21 and the right camera 22. In the overlapped region, since the similar objects are captured by both cameras, a feature of the image is likely to be similar.

Subsequently, in the next step, a feature of image is acquired from the overlapped region of the respective images (S150). As for the feature of image, for example, luminance values are analyzed for respective pixels that configure the overlapped regions and pixels are sorted by every luminance value so as to obtain the histogram as shown in FIGS. 4 and 5.

Figure 4:
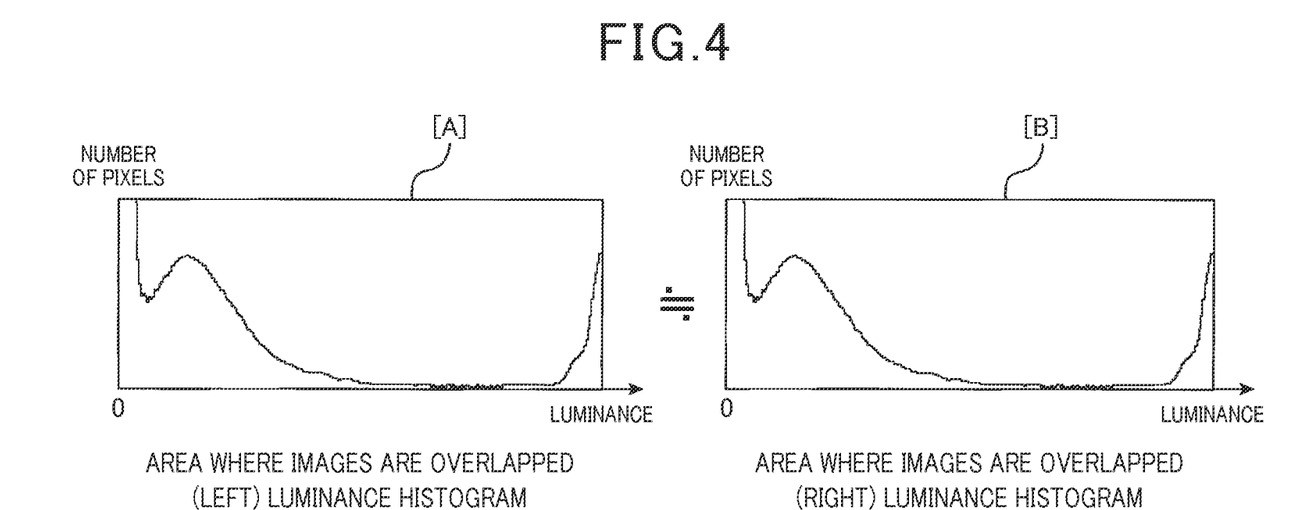
Figure 5:
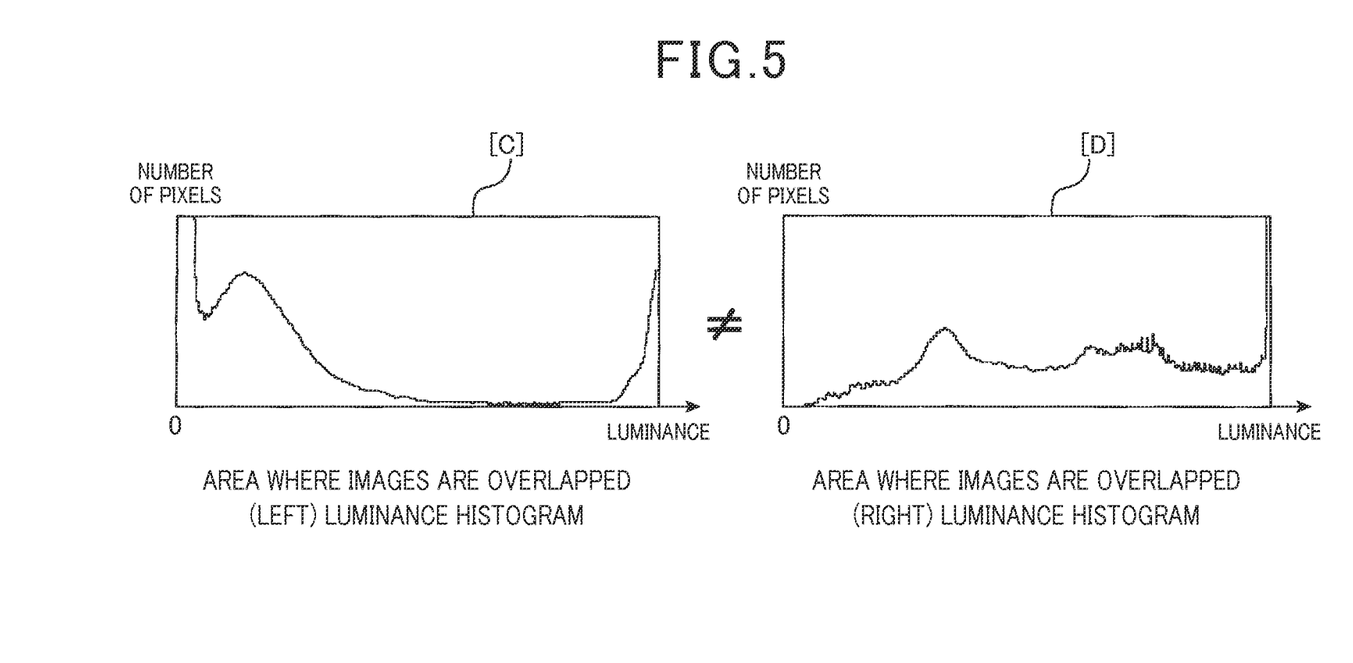

In the horizontal axis of the histogram as shown in FIGS. 4 and 5, the left end of the luminance value is 0 and the luminance value increases as it approaches to the right end in the horizontal axis. The vertical axis of the histogram represents the number of pixels categorized to the same luminance value.

Subsequently, the process compares features of image (S160). This process determines whether or not a feature of image in the overlapped region of the left camera 21 and a feature of image in the overlapped region of the right camera 22 are similar. In an example as shown in FIG. 4, a shape of the histogram [A] that shows features of image in the overlapped region of the left camera 21 and a shape of the histogram [B] that shows features of image in the overlapped region of the right camera 22 are similar.

Meanwhile, an example as shown in FIG. 5, a shape of the histogram [C] that shows features of image in the overlapped region of the left camera 21 and a shape of the histogram [D] that shows features of image in the overlapped region of the right camera 22 are completely different from each other, i.e., dissimilar. Thus, whether or not the histograms are similar is determined, for example, by calculating a function that represents an approximation curve of the histogram to determine whether or not difference of the coefficients of respective functions of those approximation curves is within an allowable range.

Subsequently, the process performs a test pattern checking (S170). The process commands the left camera 21 and the right camera 22 to output test patterns to acquire respective test patterns, thereby determining whether or not the test pattern shows normal.

Whether or not the test pattern is normal can be determined by an average luminance value or whether or not the test patterns include a predetermined shape or the like. Since the cameras 21 and 22 always outputs the same test pattern in the normal condition, if the test patterns include defective pattern, the process is able to determine the camera has a fault.

Subsequently, the process stores a comparison result between features of images and determination result whether or not failure exists in the test pattern in the memory 12 (S180). Then, the process compares the variable n and the number N used for determining failure (S210).

When the variable n is less than the number N (S210: NO), the process increments the variable n and return to step S120. Also, when the variable n is larger than or equal to N (S210: YES), the process determines whether or not failure has occurred and the camera which has the failure (S230).

As for whether or not failure exists, for example, the process recognizes the number of determinations in which features of image are dissimilar is more than or equal to a reference value (e.g., more than 80%), thereby detecting failure in any of cameras. Also, when the number of failures detected in the test patterns of a plurality of cameras is more than or equal to a reference value (e.g., 80%), the process may identify a plurality of cameras have failure.

Next at step S240, the process determines whether or not any camera exists in which failure has been identified. If the camera having failure exists (S240: YES), the process perform a fail-safe process (S250).

In this process, for example, the process outputs a command not to use images captured by a camera having failure. According to the embodiment, the command is transmitted to the image processing unit 26. After completion of such processes, the process terminates the failure decision procedure.

In step S240, when no camera having failure is identified (S240: NO), the process performs normal operation setting (S260). In the normal operation setting, the process does not output a command not to use images captured by a specific camera and processes are performed using images captured by all cameras. After completion of such processes, the process terminates the failure decision procedure.

Advantages of the Present Embodiment

In the failure detecting apparatus 1 as described in detail, the control unit 10 acquires respective images captured by a plurality of imaging device in which exposure can be individually controlled, having overlapped regions that represent overlapped image region. The control unit 10 extracts respective overlapped regions in a plurality of acquired images and extracts features of image (distribution of luminance and color (histogram), type of object detected in the region) in plurality of overlapped regions which are extracted. The control unit 10 compares features of images in a plurality of overlapped regions, determines whether or not these features of images are similar and determines the imaging device has a failure when these features of images are no similar.

Specifically, in the failure detecting apparatus 1, even in a case where images are acquired by different imaging devices, by using characteristics in which probability of having similar features of images in the overlapped region is high, a failure decision procedure is performed based on whether or not features of images are similar. According to the above-described failure detecting apparatus 1, failure of the imaging device can favorably be detected.

Further, in the above-described failure detecting apparatus 1, the control unit 10 generates histograms for every overlapped region based on luminance or color of the respective pixels that constitutes the plurality of overlapped regions and compares histograms among a plurality of histograms, thereby determining whether or not features of images are similar.

According to the above-described failure detecting apparatus 1, compared to an image processing method such as pattern matching, processing load when determining similarity can be reduced. Moreover, in the above-described failure detecting apparatus 1, a plurality of imaging devices is configured to output, when receiving a test output signal from an external device, a test image which is prepared in advance instead of captured image and the control unit 10 transmits the test output signal to each of a plurality of imaging devices, determines whether or not test images outputted from the plurality of imaging devices is normal and determines that an imaging device that outputs abnormal test image has a failure.

According to the failure detecting apparatus 1, an imaging device having failure can be identified without using illuminance. The control unit 10 in the above-described failure detecting apparatus 1 acquires an operational state of the wiper and extracts the overlapped region from the acquired images in which the wiper is not included.

According to the above-described failure detecting apparatus 1, features of images are avoided from changing by the wiper included in the captured image. Also, in the above-described failure detecting apparatus 1, the control unit 10 repeatedly acquires a plurality of images, extracts respective overlapped regions and features of images in the plurality of images repeatedly acquired and determines whether or not the features of the images are similar. Then, the control unit 10 determines that failure has occurred in the imaging device, when the control unit determines for plural times that features of plurality of images which are repeatedly acquired are not similar.

According to the above-described failure detecting apparatus 1, the control unit 10 determines that failure has occurred in the imaging device in a case where it is determined that features of images are not similar for not only one time but also plural times. Therefore, erroneous-determination as a result of determination that features of images are not similar temporarily can be avoided.

In the failure detecting apparatus 1, the control unit 10 makes an application that uses captured image to perform a failsafe process set in advance in the application, when failure in the imaging device is determined.

According to the above-described failure detecting apparatus 1, the failsafe process is performed in a process that uses captured image, thereby controlling the process to be safer side.

Further, in the above-described failure detecting apparatus 1, the control unit 10 executes, as a failsafe process, a process without using an imaging device in which failure has occurred. According to the above-described failure detecting apparatus 1, since the imaging device in which failure has occurred is not used, erroneous operation caused by using an imaging device having a failure can be avoided.

In the above-described failure detecting apparatus 1, the control unit 10 controls a plurality of imaging devices to capture images with the same exposure condition and acquires a plurality of images captured with the same exposure condition. According to the failure detecting apparatus 1, images can be captured with the same exposure condition so that condition to acquire feature of image can be the same condition. As a result, an accuracy for determining failure can be improved.

Other Embodiments

The present disclosure is not limited to the above-described embodiment. The reference numbers used for the above-described embodiment are also appropriately used for claims. These reference numbers are used in order to make understanding of the disclosure easier and not to limit technical scope of the disclosure according to the respective claims. Further, a function included in a single element of the above-described embodiment may be divided into a plurality of elements or a function included in a plurality of elements may be integrated to single element. Furthermore, at least some of the configurations according to the above-described embodiment may be substituted by a publicly-known configuration using similar functions. Also, some of configurations according to the above-described embodiment may be omitted as long as the same effects and advantages are obtained. Moreover, some of the configurations of the above-described embodiment may be added to other configurations of the above-described embodiment. Also, other configurations of the above-described embodiment may be substituted by some of the configurations of the above-described embodiment. It should be noted that various aspects included in technical ideas which are identified by terms described in the scope of claims are all the embodiments according to the present disclosure.

Other than the above-described failure detection apparatus 1, the present disclosure may be accomplished by various modes such as a system having the failure detection apparatus 1 as an element thereof, a program used for a computer serving as the failure detection apparatus 1, computer media in which the program is stored therein or a failure detecting method.

Figure 6:
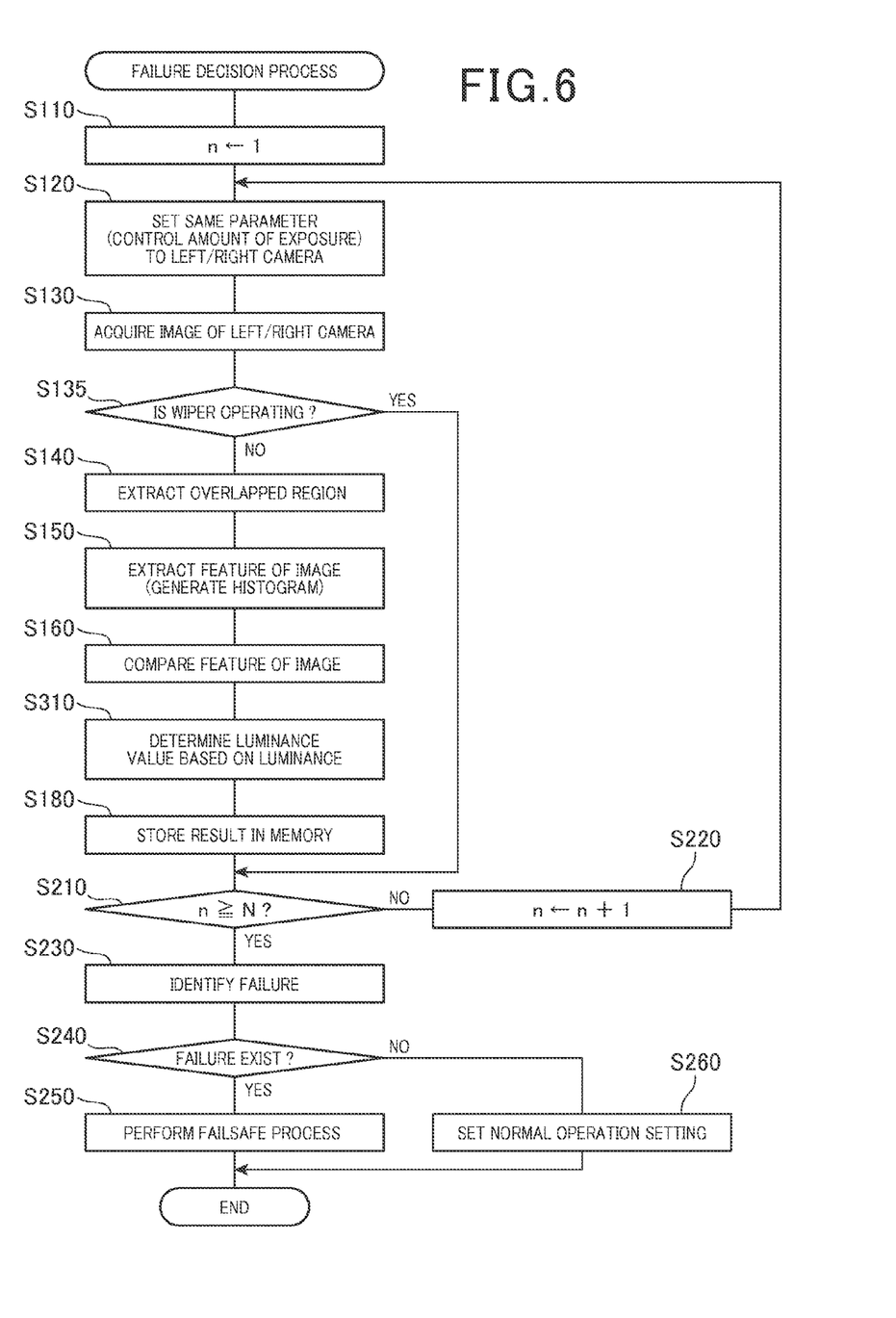
FIG. 6 is a flow chart showing a failure decision procedure according to other embodiments.

For example, in the above-described failure detecting apparatus 1, the control unit 10 acquires luminance surrounding the imaging device, compares respective actual luminance values at a plurality of overlapped regions with a reference luminance value at an overlapped region based on a luminance prepared in advance, when feature of image is not similar. Then, the control unit 10 may determine that an imaging device having actual luminance value which is far from the reference luminance value has failure. Specifically, instead of step S170, the control unit 10 may execute a process of step S310.

In other words, a luminance value (e.g., average luminance value) to be obtained depending on brightness surrounding the imaging device or a range of luminance value (reference luminance value (including a range)) is prepared in advance. The process determines whether or not a luminance value (actual luminance value, e.g., average luminance value) of a captured image corresponding to detection result by the illuminance sensor 23 has obtained. Then, the process determines that an imaging device having a luminance value which is far from the reference value is a failed device.

According to the failure detecting apparatus, since the process determines, for every captured image, whether or not luminance value to be obtained depending on the luminance is actually obtained, an imaging device having failure can be identified. Further, in step S150 according to the above-described embodiments, a histogram is employed for features of images. However, it is not limited to this configuration. For example, as a feature of image, similarity produced in an object recognition result by using a pattern matching process may be used. In this case, in a process of step S160, for example, the number of objects recognized such as human, other vehicles, traffic barrier, traffic signs, trees or the like, may be compared.

Moreover, according to the above-described embodiment, two cameras, i.e., the left camera 21 and the right camera 22 are used. However, three or more cameras may be used if the overlapped regions are present. In this case, overlapped regions being shared by all cameras are not necessarily present, but an overlapped region produced by respective cameras and at least one camera may be present. Also, the respective cameras are not limited to a stereo camera in which respective cameras are disposed in parallel.

Correspondence Between Configurations of the Embodiments and Elements of the Present Disclosure A process at step S120 in processes executed by the control unit 10 in the above-described embodiment corresponds to exposure controlling means. A process at step S130 of the above-described embodiments corresponds to image acquiring means. A process at step S135 of the above-described embodiments corresponds to wiper state acquiring means. A process at step S140 of the above-described embodiments corresponds to region extracting means.

Further, a process at step S150 according to the above-described embodiment corresponding to feature extracting means. A process at step S160 according to the above-described embodiment corresponds to similarity determining means. A process at step S230 according to the above-described embodiment corresponds to failure determining means. A process at step S240 and S250 according to the above-described embodiment correspond to failsafe means.

What is claimed is:

1. A failure detecting apparatus that detects failure of an imaging device comprising:
   acquiring means for acquiring a plurality of images captured by a plurality of imaging devices in which exposures thereof are capable of being individually controlled, the plurality of images including an overlapped region that represents a region where images are overlapped;
   region extracting means for extracting a plurality of overlapped regions from the plurality of images acquired by the acquiring means;
   feature extracting means for extracting features of image from the plurality of overlapped regions extracted by the region extracting means;
   comparing means for comparing the features of image between the plurality of overlapped regions;
   similarity determining means for determining whether or not the features of image are similar based on a result of comparing by the comparing means; and
   failure determining means for determining a failure in the imaging device when the similarity determining means determines the features of image are not similar.

2. The failure detecting apparatus according to claim 1, wherein
   the feature extracting means is configured to generate histograms for every overlapped region, based on luminance or color of respective pixels that constitute the plurality of overlapped regions and compare histograms among a plurality of histograms, thereby determining whether or not features of images are similar.

3. The failure detecting apparatus according to claim 1, wherein
   the plurality of imaging devices is configured to output, when receiving a test output signal from an external device, a test image which is prepared in advance instead of the captured images; and
   the failure determining means is configured to transmit the test output signal to each of the plurality of imaging devices, determine whether or not the test image outputted from the plurality of imaging devices is normal and determine that an imaging device that outputs abnormal test image has a failure.

4. The failure detecting apparatus according to claim 1, wherein
   the failure detecting apparatus includes luminance acquiring means for acquiring luminance surrounding the imaging device; and
   the failure determining means is configured to compare respective actual luminance values at the plurality of overlapped regions with a reference luminance value at an overlapped region based on a luminance prepared in advance, when features of image is not similar and determine that an imaging device having actual luminance value which is far from the reference luminance value has a failure.

5. The failure detecting apparatus according to claim 1, wherein
   the failure detecting apparatus is mounted on a vehicle and includes wiper state acquiring means for acquiring an operational state of the wiper; and
   the region extracting means is configured to extract the overlapped region from acquired images in which the wiper is not included.

6. The failure detecting apparatus according to claim 1, wherein
   the acquiring means is configured to repeatedly acquire a plurality of images;
   the region extracting means, the feature extracting means and
   the similarity determining means are configured to extract respective overlapped regions and features of images in the plurality of images repeatedly acquired, and determine whether or not the features of the images are similar; and
   the failure determining means is configured to determine that failure has occurred in the imaging device, when determining for plural times that features of plurality of images repeatedly acquired are not similar.

7. The failure detecting apparatus according to claim 1, wherein the failure detecting apparatus includes failsafe means for making an application that uses the captured image to perform a failsafe process set in advance, when failure in the imaging device is determined.

8. The failure detecting apparatus according to claim 7, wherein
the failsafe means is configured to execute, as a failsafe process, a process without using an imaging device in which failure has occurred.

9. The failure detecting apparatus according to claim 7, wherein
the failure detecting apparatus includes exposure controlling means for controlling a plurality of imaging devices to capture images with the same exposure condition; and
the acquiring means is configured to acquire a plurality of images captured with the same exposure condition.

10. A system for detecting failure of an imaging device comprising:
a central processor;
a computer-readable storage medium; and
a set of computer-executable instructions stored on the computer-readable storage medium that cause the central processor to implement:
acquiring a plurality of images captured by a plurality of imaging devices in which exposures thereof are capable of being individually controlled, the plurality of images including an overlapped region that represents a region where images are overlapped;
extracting a plurality of overlapped regions from the plurality of images acquired;
extracting features of image from the plurality of overlapped regions extracted;
comparing the features of image between the plurality of overlapped regions;
determining whether or not the features of image are similar based on a result of comparing; and
determining a failure in the imaging device when the features of image are not similar.

11. A method for detecting failure of an imaging device comprising:
acquiring a plurality of images captured by a plurality of imaging devices in which exposures thereof are capable of being individually controlled, the plurality of images including an overlapped region that represents a region where images are overlapped;
extracting a plurality of overlapped regions from the plurality of images acquired;
extracting features of image from the plurality of overlapped regions extracted, wherein extracting features of image from the plurality of overlapped regions extracted further comprises: generating histograms for every overlapped region, based on luminance or color of respective pixels that constitute the plurality of overlapped regions and comparing histograms among a plurality of histograms, thereby determining whether or not features of images are similar;
comparing the features of image between the plurality of overlapped regions;
determining whether or not the features of image are similar based on a result of the comparing; and
determining a failure in the imaging device when the features of image are not similar.

12. The method for detecting failure of an imaging device according to claim 11, further comprising:
outputting, when receiving a test output signal from an external device, a test image from the plurality of imaging devices which is prepared in advance instead of the captured images; and
transmitting the test output signal to each of the plurality of imaging devices, determining whether or not the test image outputted from the plurality of imaging devices is normal and determining that an imaging device that outputs abnormal test image has a failure.

13. The method for detecting failure of an imaging device according to claim 11, further comprising:
acquiring luminance surrounding the imaging device; and
comparing respective actual luminance values at the plurality of overlapped regions with a reference luminance value at an overlapped region based on a luminance prepared in advance, when features of image is not similar and determine that an imaging device having actual luminance value which is far from the reference luminance value has a failure.

14. The method for detecting failure of an imaging device according to claim 11, further comprising:
acquiring an operational state of a wiper; and
extracting the overlapped region from acquired images in which the wiper is not included.

15. The method for detecting failure of an imaging device according to claim 11, further comprising:
acquiring repeatedly a plurality of images;
extracting respective overlapped regions and features of images in the plurality of images repeatedly acquired, and determining whether or not the features of the images are similar; and
determining that failure has occurred in the imaging device, when determining for plural times that features of plurality of images repeatedly acquired are not similar.

16. The method for detecting failure of an imaging device according to claim 11, further comprising:
performing a failsafe process set in advance, when failure in the imaging device is determined.

17. The method for detecting failure of an imaging device according to claim 16, further comprising:
executing, as a failsafe process, a process without using an imaging device in which failure has occurred.

18. The method for detecting failure of an imaging device according to claim 16, further comprising:
controlling a plurality of imaging devices to capture images with the same exposure condition; and
acquiring a plurality of images captured with the same exposure condition.

* * * * *